C. J. MANNING.
DOUBLE SPRING GAGE.
APPLICATION FILED JULY 25, 1913.
1,100,756.
Patented June 23, 1914.
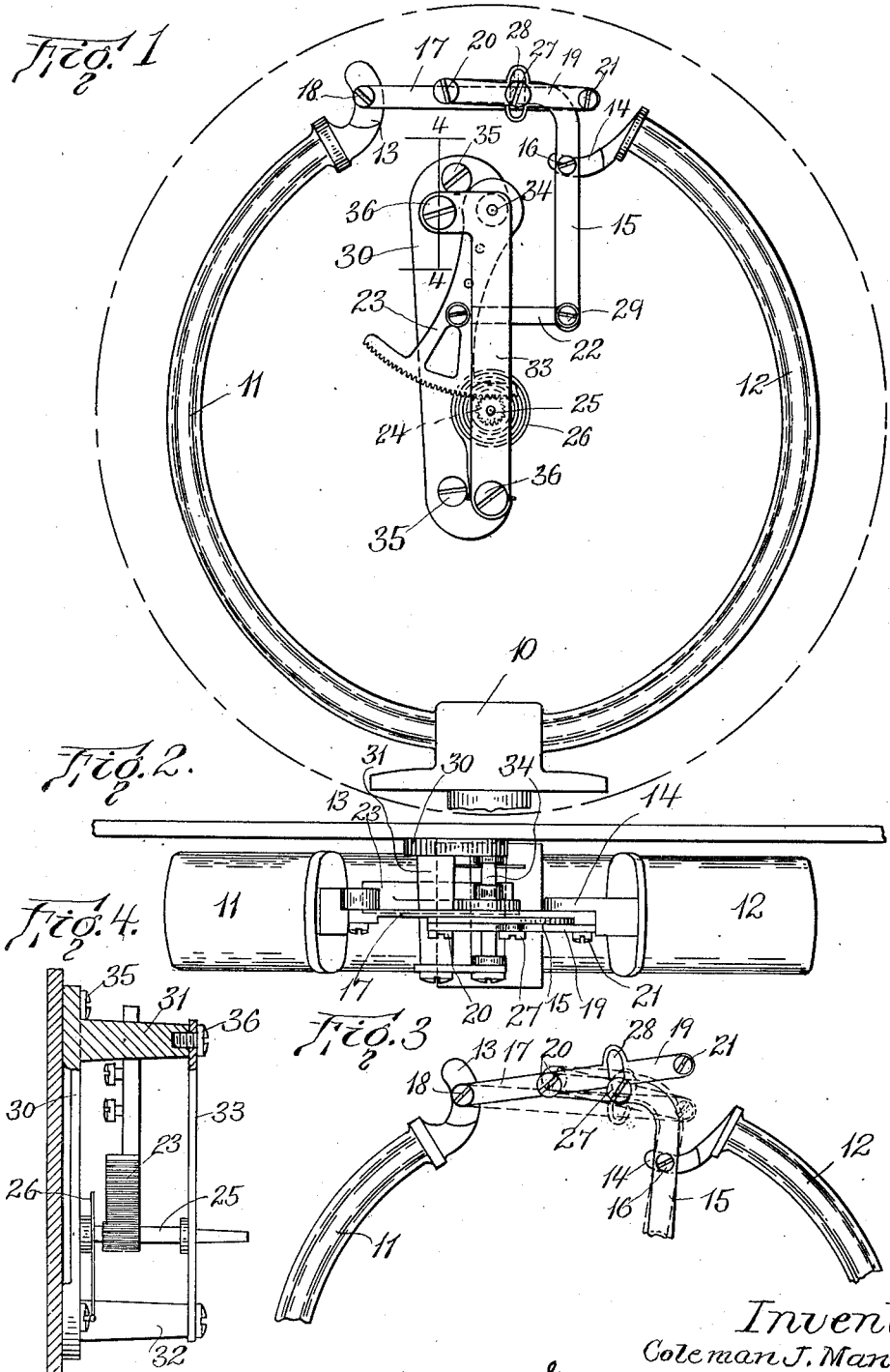

UNITED STATES PATENT OFFICE.

COLEMAN J. MANNING, OF MEDFORD, MASSACHUSETTS, ASSIGNOR TO AMERICAN STEAM GAUGE & VALVE MANUFACTURING CO., OF BOSTON, MASSACHUSETTS, A CORPORATION OF MASSACHUSETTS.

DOUBLE-SPRING GAGE.

1,100,756.      Specification of Letters Patent.      Patented June 23, 1914.

Application filed July 25, 1913. Serial No. 781,118.

*To all whom it may concern:*

Be it known that I, COLEMAN J. MANNING, a citizen of the United States, and resident of Medford, in the county of Middlesex and State of Massachusetts, have invented certain new and useful Improvements in Double-Spring Gages, of which the following is a specification.

This invention relates to gages of the Bourdon type, and particularly to gages in which the effects of two Bourdon spring tubes are compounded to actuate a single indicator or recorder, such as, for instance, a pointer, a hand or a marker, arranged to travel over a dial.

The objects of the invention are, mainly, to furnish a simple mechanism for transmitting the motion of the spring tubes to the indicating element, of which the parts may be used interchangeably and without special fitting, not only in all gages of the same size and calibration, but also in gages of widely varying sizes and designed to indicate or record widely varying pressures; to make provision for such adjustment of the transmitting mechanism that spring tubes of the same size and power may be used in instruments designed for different pressures; and to provide an improved movement frame for the gearing which directly actuates the indicating element.

Heretofore it has been necessary in practice to fit the parts of the transmitting mechanisms specially for each instrument and to use particular care in locating the points of connection of such parts with each other and with the spring tubes, with the result that such parts could be used only in the instrument to which they were fitted and not in any other instrument, and that the manufacture and calibration of accurate gages has been a difficult and expensive matter, and it has been necessary to provide special spring tubes for each class of gage.

It is the purpose of the present invention to enable the parts of the transmission mechanism to be made in quantities, all duplicates of the same parts being exactly alike, ready to be assembled correctly and without necessity of special fitting or particular care in assembling, in instruments of diverse qualities, and in condition to be calibrated and so made ready for use by a single adjustment; and also to make unnecessary the provision of spring tubes specially constructed for various pressures, by providing for such a range of calibration adjustment in the transmitting mechanism that the same spring tubes may be employed in a wide variety of gages designed for different pressures.

In the drawings forming a part of this application, Figure 1 represents an elevation of the preferred embodiment of my invention, represented as assembled in operative condition in the gage, Fig. 2 is a plan view of the apparatus shown in Fig. 1, Fig. 3 is an elevation of the parts shown in the upper portion of Fig. 1, illustrating extreme adjustments of the transmission mechanism, Fig. 4 is a side elevation and partial section on line 4—4 of Fig. 1 of the movement frame which supports that part of the transmission mechanism which is known as the movement.

The same reference characters indicate the same parts in all the figures.

In the drawings 10 represents a hollow head which is fitted in the casing of the gage and is adapted to be put into communication with the pressure to be measured. Curved spring tubes 11 and 12 are attached to opposite sides of the head in communication with the interior thereof and extend oppositely therefrom, being at opposite sides of the gage and curved about substantially the same center. These spring tubes are of the common Bourdon type, which are commonly known in the art as springs. The ends of the spring tubes are closed and have projecting lugs or fingers 13 and 14, respectively, for connection with the transmitting mechanism.

The transmitting mechanism consists of a bell crank lever 15 pivoted by means of a stud 16 to the projection or lug 14 of the spring tube 12, a link 17 pivoted by a stud 18 to the lug or finger 13 of spring tube 11, an intermediate link 19 pivoted at 20 to one arm of the bell crank lever 15 and at 21 to the link 17, and a link 22 which connects the bell crank lever 15 with the gearing known in the art as the "movement" of the gage which consists of a gear segment 23 and a pinion 24 which meshes with the teeth of the segment 23 and is fixed upon a shaft or spindle 25 which carries the indicating or recording element. A coiled spring 26 is provided as usual to return the indicator to zero position when the spring tubes are relaxed, that is, not distorted by a difference between internal and external pressures.

The present invention relates particularly to that part of the transmitting mechanism which consists of the lever 15 and links 17 and 19. These members or parts are freely connected pivotally with the spring tubes and with each other by means of the studs 16, 18, 20, and 21, which studs may have cylindrical shanks fitting freely in the holes provided for them in the above described parts and shouldered threaded ends for attachment to the parts in which they are movably mounted. In each case the distance between the shoulder adjacent to the threaded end and the head of the stud may be slightly greater than the thickness of the part which receives the smooth shank of the stud so that the pivotally mounted part will not be bound by the head of the stud. The stud 20 is rigidly mounted in this manner on the end of the bell crank lever 15 and the stud 21 is rigidly mounted in the end of the link 17, the intermediate link 19 being pivoted freely at its opposite ends on these studs. The link 19 may be prevented from swinging upon the pivot stud 20 by means of a clamp screw 27 which passage through a slot 28 in a widened part of the link 19 and is threaded into the lever 15, being adapted to bind the link 19 against the adjacent arm of the lever 15 by means of its head. When clamped in this manner the link 19 becomes in effect a rigid part of the lever 15 so that the distance between the pivot 16 and the connection 21 becomes one of the arms of this lever, the other arm being the one which is connected with the link 22 by the stud 29. By swinging the link 19 about the pivot 20 the distance between the pivots 16 and 21 may be varied, and then fixed by screwing down the clamping screw 27. When the said screw is made firm, the link 19 is a rigid part of the lever 15, and the point of application of the pull or thrust of link 17 is the pivot 21, which makes the effective lever arm through which the spring tube 11 acts on the lever 15, the distance between the points 16 and 21. This distance may be increased or diminished and the effective lever arm therefore correspondingly altered by raising or lowering the link 19. In Fig. 3 the full lines show the uppermost limit of adjustment and the dotted lines the lower limit of adjustment of these parts. The fact that in these adjustments the links 17 and 19 swing about pivots 18 and 20 which are near together enables the adjustment to be made without displacing the lever 15 to any material extent, that is, to an extent great enough to cause any difficulty in calibrating the gage. It would be possible to extend the lever 15 far enough to bring the pivot 20 substantially coaxial with the pivot 18, and in such case the adjustments could be made without causing any change whatever in the angular position of lever 15. The proportions illustrated are desirable, however, because they enable the same sized levers 15 and links 19 to be used in gages of widely varying sizes, that is, gages relatively much smaller than those shown in these drawings.

The movement of the two spring tubes 11 and 12 under pressure is compounded by the lever 15 and by the latter applied to the indicator. The amount of movement given to the indicator is determined both by the spring of the tubes and by the movement imparted to the end 29 of the lever thereby. Spring tubes are designed for certain pressures, and are graded according to the pressures which cause their free ends to move a certain amount. For instance, tubes are graded as 400 pound springs, 300 pound springs, etc., according as their free ends are caused to spring approximately the same amount, which is in the neighborhood of a quarter of an inch by pressures of 400 pounds, 300 pounds, etc.

My invention is of particular importance in that it enables springs graded alike to be used in gages of different calibration, securing this result by the adjustment of the pivot point 21. Evidently when the pivot 21 is widely separated from the pivot 16 a certain movement of the spring tubes will not move the pivot 29 and the indicator so far as the same movement of the tubes when the pivot 21 is nearer to the pivot 16. Thus a spring graded as a 400 pound spring, for instance, may be used not only in a gage rated as a 400 pound gage, but also in a wide range of gages having higher or lower ratings, the use being made possible with exact calibration and perfect accuracy by the adjustment provided for the pivot 21. By this means the manufacturer is relieved of the necessity of keeping large numbers of so many grades of spring tube in stock as he would be required to do if a spring of a certain grade only could be used in gages of a particular rating.

Another advantage of the improved mechanism is that the parts may be produced in large quantities, by economical methods of manufacture, with their pivot holes bored and located by jigs or other fixed standards and that the parts so produced may be used interchangeably for one another for all the gages of a wide range. So far as I am aware this is an advantage never secured by any mechanism heretofore produced, and it is certainly not obtainable by the practical methods in present use. According to the practised methods, the parts for each individual gage, or each type of gage require special fitting in some particulars. In my device each of the members is in one piece and is neither extensible nor otherwise adjustable. Only one adjustment is provided or is necessary, and this adjustment is sufficient to effect proper calibration of gages within wide limits of rating.

A further improvement resides in the frame which supports the indicator movement. This frame consists of a plate 30 having posts 31 and 32 to which is secured an upper plate 33, the said plates 30 and 33 containing bearings for the element 25 and for the arbor 24 of the segment 23. The bottom plate 30 is secured to the back wall of the gage by screws 35 and the top plate 33 is secured to the posts by screws 36. Heretofore movement frames of gages have been provided with posts which are structurally independent and separate from both plates, and this has given trouble, particularly in locomotive gages and other gages subjected to jarring, by reason of the tendency of the posts to become loose. By this improvement the posts 31 and 32 are made integral with the bottom plate 30, as appears from Fig. 4, being formed as a part of the same casting or forging. No amount of jarring can possibly loosen these integral posts from the bottom plate, and the movement frame is thus more rigid and secure than any heretofore made.

I do not limit the invention to gages in which the pressures dealt with are greater than atmospheric, since the same principles could be employed in a vacuum gage as well. Neither do I desire in all respects to limit the invention to a double spring gage, that is, to one having two spring tubes, nor to a gage in which the pressure-operated members are actually curved spring tubes rather than elements or members having other shapes. As a matter of general statement it may be considered that the fingers 13 and 14 are abutments for the lever 15 and the link 17, respectively, either or both of which may be movable and either of which might be stationary, when applied to certain conditions; and that the adjustable links 19 and 17 provide means for connecting the lever with the abutment 13 and for adjusting the length of that arm of the lever which is connected to said abutment.

What I claim and desire to secure by Letters Patent is:—

1. In a gage for indicating pressure differences, the combination of two members, one of which is relatively movable with respect to the other, and one of which is a pressure actuated member, while the other is an abutment, a lever pivotally mounted on one of said members, a link pivoted to the other of said members, an intermediate link pivotally connected with both said lever and said first-named link, means for rigidly clamping said intermediate link to the lever in various positions angularly about its point of connection with the lever, an indicator, and means for transmitting motion from said lever to said indicator.

2. In a pressure gage the combination, with a pressure actuated member, of a transmitting mechanism consisting of a lever, an abutment, a link pivoted to said abutment, and an intermediate link connected both with said lever and the first named link, its point of connection with the lever being between and substantially in line with the ends of the first named link, said intermediate link being adjustable about its point of connection with the lever, and means for securing said link in its adjustments.

3. A motion-transmitting mechanism for pressure gages comprising a spring tube, an abutment, a lever pivoted to said tube and having an arm extending toward said abutment, a link pivoted to said arm at a point near the abutment and extending away from the abutment and a second link pivoted to the abutment and extending approximately parallel to the first link and pivoted to the latter, said first named link having a transverse slot, and means mounted on said lever arm and passing through said slot for clamping said link in various positions of angular adjustment to said arm.

4. In a pressure gage the combination of a pressure actuated member, an indicator and a motion transmitting mechanism, consisting of an abutment, a lever pivoted to said pressure actuated member and having a connection at one end for applying motion to said indicator, a link pivoted to said abutment, a link pivoted to said lever and also to said first named link, said pivot points being all approximately in line and the pivot between the lever and second link being intermediate the pivot points of the first link, and the pivot point between the two links being approximately in line with the fulcrum of the lever and its connection with the indicator operating connections.

5. In a pressure gage the combination of a pressure-operated member and an abutment, a lever pivoted to said abutment, a link pivoted to said pressure-operated member, an intermediate element connecting said link and lever and so arranged that its point of connection with the lever is between and approximately in line with the ends of the link in all positions, said intermediate connection being adjustable angularly with respect to the lever, and means for securing the adjustments of said connection.

In testimony whereof I have affixed my signature, in presence of two witnesses.

COLEMAN J. MANNING.

Witnesses:
E. P. BRANNEN,
P. W. PEZZETTI.

It is hereby certified that in Letters Patent No. 1,100,756, granted June 23, 1914, upon the application of Coleman J. Manning, of Medford, Massachusetts, for an improvement in "Double-Spring Gages," an error appears in the printed specification requiring correction as follows: Page 2, line 41, for the word "passage" read *passes;* and that the said Letters Patent should be read with this correction therein that the same may conform to the record of the case in the Patent Office.

Signed and sealed this 7th day of July, A. D., 1914.

[SEAL.]

R. F. WHITEHEAD,
*Acting Commissioner of Patents.*